(12) United States Patent
Arici et al.

(10) Patent No.: US 8,175,160 B1
(45) Date of Patent: May 8, 2012

(54) SYSTEM, METHOD, AND COMPUTER PROGRAM PRODUCT FOR REFINING MOTION VECTORS

(75) Inventors: Tarik Arici, Santa Clara, CA (US); Elif Albuz, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 990 days.

(21) Appl. No.: 12/135,895

(22) Filed: Jun. 9, 2008

(51) Int. Cl.
*H04N 7/12* (2006.01)
*H04N 11/02* (2006.01)
*H04N 11/04* (2006.01)
*G06K 9/46* (2006.01)

(52) U.S. Cl. ......... 375/240.16; 375/240.17; 375/240.21; 382/236

(58) Field of Classification Search .................. None
See application file for complete search history.

(56) References Cited

U.S. PATENT DOCUMENTS

| | | | | |
|---|---|---|---|---|
| 5,742,710 A * | 4/1998 | Hsu et al. | ...................... | 382/236 |
| 5,818,536 A * | 10/1998 | Morris et al. | ............ | 375/240.15 |
| 5,929,940 A * | 7/1999 | Jeannin | ......................... | 348/699 |
| 6,865,227 B2 * | 3/2005 | Chan | ........................ | 375/240.16 |
| 7,346,109 B2 * | 3/2008 | Nair et al. | ................ | 375/240.16 |
| 7,400,680 B2 * | 7/2008 | Jiang | ........................ | 375/240.16 |
| 7,590,180 B2 * | 9/2009 | Kang | ........................ | 375/240.16 |
| 2005/0232499 A1 * | 10/2005 | Ha et al. | ........................ | 382/236 |
| 2007/0014477 A1 * | 1/2007 | MacInnis et al. | ............. | 382/236 |
| 2009/0109342 A1 * | 4/2009 | Heng et al. | ..................... | 348/699 |

OTHER PUBLICATIONS

Braspenning et al., "True-Motion Estimation using Feature Correspondence," SPIE, Proceedings of VCIP, Jan. 2004, pp. 396-407.
Konrad, J., "Motion Detection and Estimation," In Image and Video Processing Handbook, Academic Press, Chapter 3.10, 2004.
de Haan, G. et al., "Sub-pixel motion estimation with 3-D recursive search block-matching," Signal Processing: Image Communication, 1994, vol. 6, pp. 229-239.
Tekalp, A. M., "Digital Video Processing," Prentice Hall, 1995, pp. xvii-xxi and 1-526.

* cited by examiner

*Primary Examiner* — Kevin C Harper
*Assistant Examiner* — Cassandra Decker
(74) *Attorney, Agent, or Firm* — Zilka-Kotab, PC (57) ABSTRACT

A system, method, and computer program product are provided for refining motion vectors. In operation, a plurality of motion vectors associated with a current frame and a first resolution are created. Furthermore, the motion vectors are refined utilizing information including at least one of first information describing motion vectors associated with a previous frame and second information describing motion vectors associated with the current frame and a second resolution.

18 Claims, 9 Drawing Sheets

SYSTEM, METHOD, AND COMPUTER PROGRAM PRODUCT FOR REFINING MOTION VECTORS

FIELD OF THE INVENTION

The present invention relates to motion estimation, and more particularly to computer code for refining motion vectors.

BACKGROUND

Currently, block-based motion estimation techniques, optical flow based motion estimation techniques, pel-recursive motion estimation techniques, and Bayesian motion estimation techniques are used for motion estimation described in literature. In hardware implementations, block-based techniques, combined with translational motion models and brightness constancy assumptions, are preferred due to the hardware compatibility of such techniques. However, block-based techniques often fail to find the true-motion of objects because of noise, compression artifacts, rotation, zooming, periodic structures, and brightness change.

There is thus a need for addressing these and/or other issues associated with the prior art.

SUMMARY

A system, method, and computer program product are provided for refining motion vectors. In operation, a plurality of motion vectors associated with a current frame and a first resolution are created. Furthermore, the motion vectors are refined utilizing information including at least one of first information describing motion vectors associated with a previous frame and second information describing motion vectors associated with the current frame and a second resolution.

DETAILED DESCRIPTION

Figure 1:
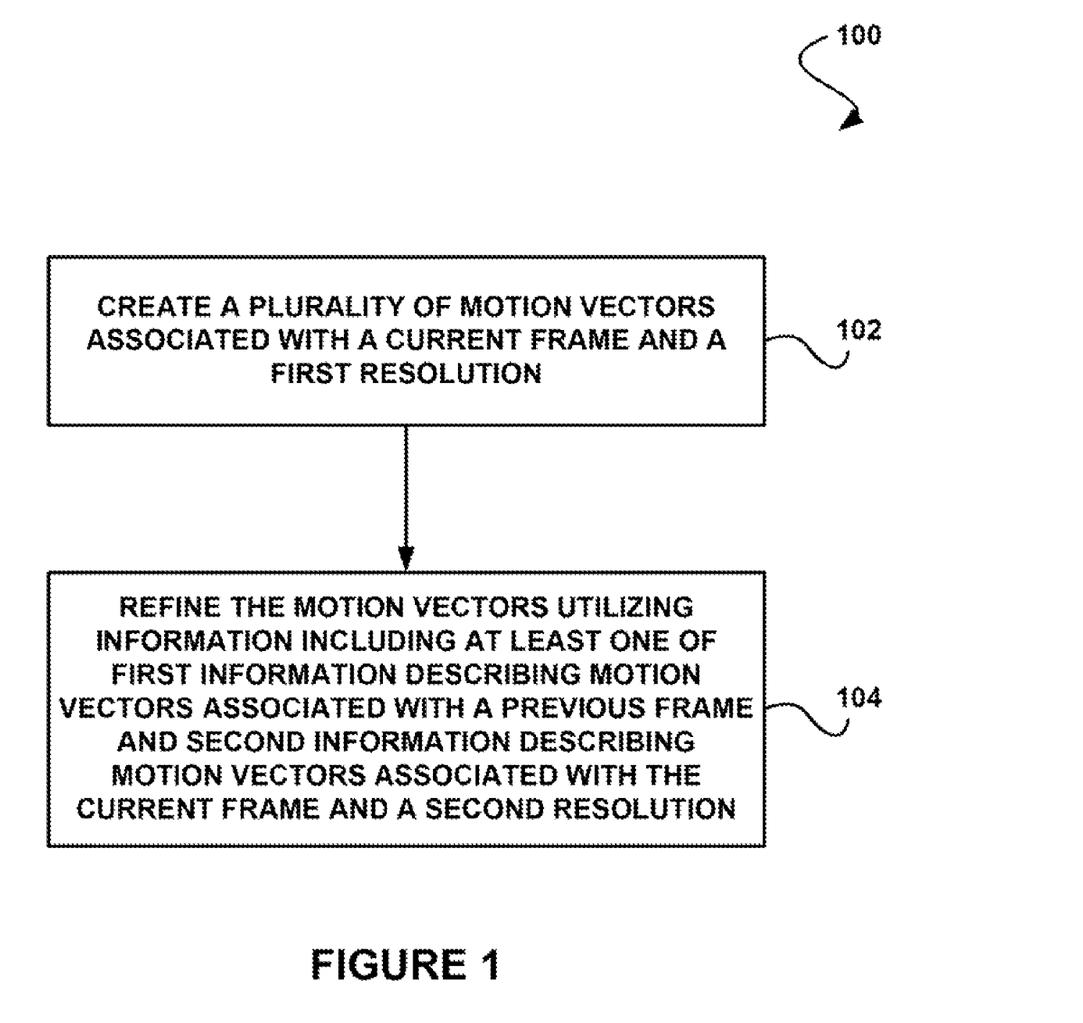
FIG. 1 shows a method for refining motion vectors, in accordance with one embodiment.

FIG. 1 shows a method 100 for refining motion vectors, in accordance with one embodiment. As shown, a plurality of motion vectors associated with a current frame and a first resolution are created. See operation 102. In the context of the present description, motion vectors refer to any vector or segment representation indicating a motion characteristic of a pixel or group of pixels corresponding to a frame. In this case, a frame refers to any image or frame of data.

Furthermore, the motion vectors are refined utilizing information including at least one of first information describing motion vectors associated with a previous frame and second information describing motion vectors associated with the current frame and a second resolution. See operation 104. The motion vectors may be refined utilizing the first and/or second information. Additionally, as an option, a subsequent iteration of the refining may be repeated utilizing an output of a previous iteration of the refining.

In the context of the present description, refining refers to any technique of converging to an actual value. In various embodiments, the refining may include selecting at least one or two of the motion vectors. Furthermore, the refining may be based on cost criteria.

In one embodiment, confidence scores associated with the motion vectors may be generated. In this case, the confidence scores and the motion vectors may be output after a plurality of iterations of the refining. The confidence scores may be generated based on variety of factors. For example, the confidence scores may be generated based on a smoothness factor. In another case, the confidence scores may be generated based on at least one of the first information and the second information.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
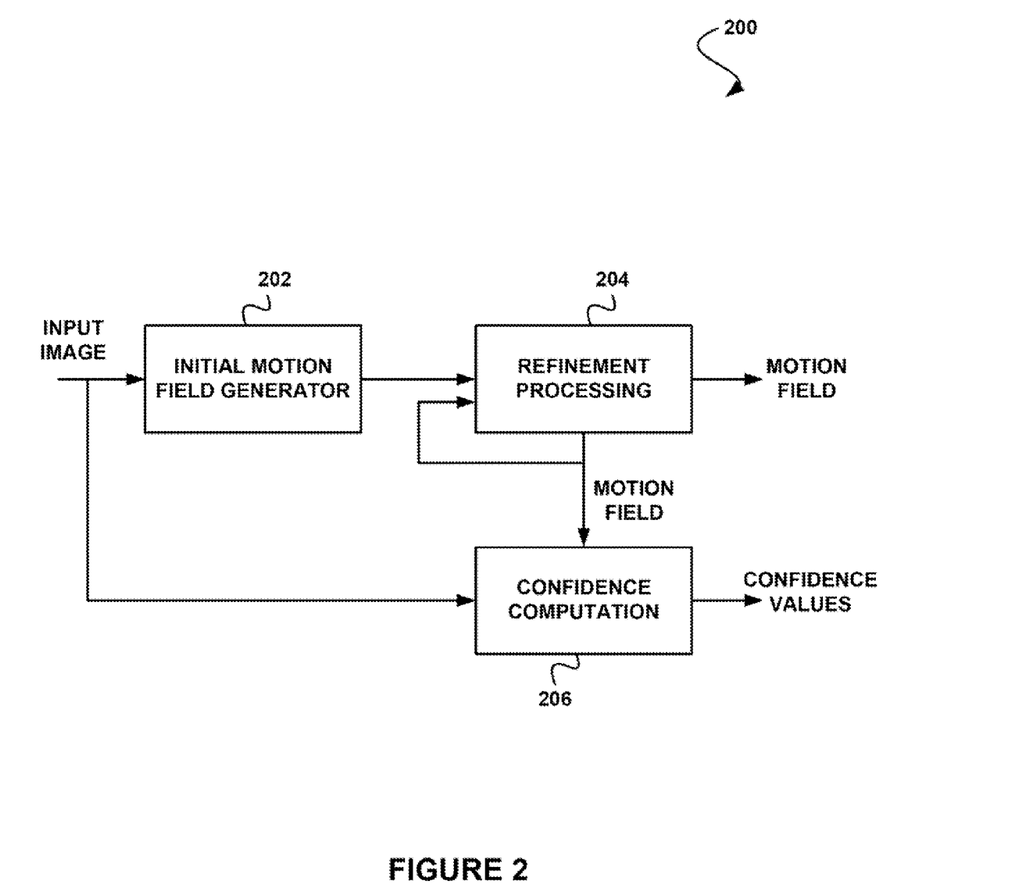
FIG. 2 shows a system for refining motion vectors, in accordance with one embodiment.

FIG. 2 shows a system 200 for refining motion vectors, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description.

As shown, the system 200 includes an initial motion field generator 202, a refinement processing engine 204, and a confidence computation engine 206. In operation, an initial motion field is generated, which is composed of motion vectors assigned to every group of pixels, or block, in an image. In one embodiment, the initial motion field generator 202 may use a block-matching based algorithm. In this case, to generate the initial motion field, a best match of a block in the image may be determined in the previous image using a search algorithm, such as a full-search or a heuristic search algorithm.

Additionally, the initial motion field generator 202 may also utilize prior motion information. For example, objects in a video have inertia. Therefore, there is a temporal correlation in the motion field. Accordingly, a set of motion vectors from the previous frame may be used to predict the best motion applicable to the current frame.

In one embodiment, a set of motion vectors $\{c_p\}$ may be used to find the best performing motion vector $c^*_p$ from the previous frame. In this case, $c^*_p$ may be obtained as the motion vector that gives a minimum block-matching error for the current block. In one embodiment, the block-matching error may be computed by finding a norm of the residual error between the block in the current image and the block in the previous image or reference image that is obtained by displacing the location of the current block with the corresponding motion vector. In this case, the error norm used may be an $l_1$ or an $l_2$ norm, where the $l_1$ norm of the residual error refers to the sum of absolute deviations (SAD), for computational simplicity.

The block-matching error for $c^*_p$, which is denoted by $SAD(c^*_p)$, may be used to determine the reliability of the prior motion information. In this way, a small value of $SAD(c^*_p)$ may indicate that the prior motion information from the previous frame applies well to the current frame. Hence, the reliability of the prior information is a function that is monotonically decreasing with $SAD(c^*_p)$.

Expression 1 shows a typical reliability function $R(c^*_p)$, in accordance with one embodiment, where $T_{prior}$ is a threshold after which $c^*_p$ has no value as prior information and is discarded.

Expression 1

$$R(c^*_p) = 1 - \frac{SAD(c^*_p)}{T_{prior}}$$

After obtaining the prior motion information $c^*_p$ and the corresponding reliability $R(c^*_p)$, the block-matching search criteria may be obtained using Expression 2, where c is any candidate motion vector in a search window and k is a constant.

$$SAD(c)+k^*R(c^*_p)(c-c^*_p)$$ Expression 2

The vector that minimizes the search criteria shown in Expression 2 may be chosen as the motion vector representing the motion of the current block. These motion vectors may be used to create the initial motion field, which may be refined. To improve the convergence of the refinement process, two top vectors may also be used to initialize the motion field before refinement.

In the case that a hierarchical motion estimation is implemented, in which multi-resolutions of the same frame are available, quarter-blocks of the coarser resolution may be used as a source of prior information for the finer resolution. For example, a fine resolution block located at coordinates (r, c) may use the motion vector of the quarter-block located at the same location (r, c) of the coarser resolution. After computing its reliability, the same block matching criteria may be applied to find the best motion vector. In this case, quarter blocks refer to blocks resulting from the halving of a larger block, both vertically and horizontally.

To refine the initial motion field, the refinement processing engine 204 may iteratively improve motion vectors by selecting the best performing motion vector from a candidate set. In one embodiment, the best performing motion vector may be the motion vector that minimizes a cost function. In this case, for each block at all iterations, the candidate set may be composed of motion vectors from a local neighborhood of the current block.

For example, in one implementation of the refinement processing engine 204, the local neighborhood for the candidate motion vector set {c} may be obtained from the motion vectors of a 3×3 or 5×5 block neighborhood of the current block. The cost function that is used to determine the best motion vector in the candidate set may be a bi-criterion cost function.

In this case, the first cost term is the block-matching error. The second cost term measures the smoothness of the motion field.

One measure for the smoothness of a vector field is the second derivative of the vector field. A discrete approximation of the second derivative is a Laplacian, as shown in Expression 3, where $k_j$ is a constant, $c_i$ and $c_j$ are vectors in the candidate set, with $c_i$ being the motion vector for which the bi-criterion cost is computed.

Expression 3

$$\Delta(c_i) = \sum_{j \in \{c\}} k_j \|c_i - c_j\|$$

In this case, if the local neighborhood for the candidate set is a 3×3 neighborhood, the Laplacian may be computed as a weighted sum of the $l_i$ norm of the vector distances. This norm may be modulated such that large motion vector discontinuities that can frequently occur on object boundaries are not punished. For example, one such method is saturation, as shown in Expression 4, where $T_{dist}$ is a threshold value. By limiting the maximum value, as shown in Expression 4, motion vector discontinuities may be preserved.

$$\min\{T_{d}, \|c_i - c_j\|\}$$ Expression 4

At each iteration in the refinement process, a motion vector c* of a block may be chosen as the one that minimizes the objective function shown in Expression 5, where α is a constant which depends on the iteration count, increasing as a function of the iteration count.

Expression 5

$$c^* = \underset{c_i \in \{c\}}{\mathrm{argmin}} SAD(c_i) + \alpha \Delta(c_i),$$

In some cases, for the first iterations, the initial motion field may have the wrong motion vectors and therefore the smoothness term may penalize the motion vectors in the wrong direction. Hence, in the first few iterations, α may be kept small. In later iterations, as the motion field is refined, α may be increased to increase the speed of the convergence of the iterative refinement process.

In one embodiment, block-matching may be implemented based on motion estimation. Block matching assumes a block of pixels is displaced with the same motion vector. Having a large block size makes the estimation more robust to noise. However, on the motion boundaries, pixels in the same block may belong to different objects. Hence, pixels of a block may have different motion.

To improve the performance, blocks may be partitioned into smaller blocks allowing independent motion. In one embodiment, blocks may be partitioned into smaller blocks by halving sizes of the blocks, both horizontally and vertically. In this case, original blocks are referred to as full-blocks and small blocks are referred to as quarter-blocks.

For each quarter-block, a candidate motion vector set $\{c\}^Q$ may be created from previously refined full-block motion vectors of the current frame and quarter-block motion vectors of the previous frame. Full-block motion vectors that are used in $\{c\}^Q$ of a quarter-block (r, c), located at row r and column c, may be obtained from four full-blocks illustrated in Expression 6, where ⌊ ⌋ denotes a flooring operation.

Expression 6

$$\left\{ \begin{array}{l} \left(\left\lfloor\frac{r+1}{2}\right\rfloor, \left\lfloor\frac{c+1}{2}\right\rfloor\right), \left(\left\lfloor\frac{r+1}{2}\right\rfloor-1, \left\lfloor\frac{c+1}{2}\right\rfloor\right), \\ \left(\left\lfloor\frac{r+1}{2}\right\rfloor, \left\lfloor\frac{c+1}{2}\right\rfloor-1\right), \left(\left\lfloor\frac{r+1}{2}\right\rfloor-1, \left\lfloor\frac{c+1}{2}\right\rfloor-1\right) \end{array} \right\}$$

In this case, quarter-block motion vectors from the previous frame are nine blocks, one of which is the quarter-block located at (r, c), and eight of which are the blocks in the 3×3 block neighborhood located at (r, c). The candidate motion vectors obtained from the full blocks of the current frame and quarter-blocks of the previous frame may be the best motion vector of a block, or the two top vectors after refinement processing.

After the candidate set is formed, the candidate set may serve as the initial motion field. Refinement processing may then be applied to quarter block motion vectors as described above. In one embodiment, the largest block size to start with may be 8×8 (8 rows and 8 columns), with quarter blocks that are 4×4. These blocks may further be partitioned into 2×2 by first forming a candidate set to serve as the initial motion field and then refining the initial motion field.

With further reference to FIG. 2, the confidence computation engine 206 determines the reliability of a computed motion vector. As an option, two information sources for inferring the reliability of a motion vector may be utilized. A first information source is the block-matching error. A second information source is the smoothness of the motion field.

The condition for a true motion vector is a small SAD value. However, in some cases, a small SAD value may not be enough. For example, in some cases, wrong periodic texture and noise matches may also produce small SAD values. Hence, it may be useful to determine whether the motion vector agrees with the motion field in its locality, which is sufficient for determining reliability. This leads to an adaptive weighting between SAD and the motion field smoothness term to compute a confidence CONF(c) using Expression 7, where w(SAD(c)) is a strictly decreasing function of SAD(c).

$$\text{CONF}(c) = [1 - w(\text{SAD}(c))]\text{SAD}(c) + w(\text{SAD}(c))\alpha\Delta(c) \quad \text{Expression 7}$$

Using the system 200, an iterative motion field refinement algorithm may be applied that outputs one motion vector for each pixel or block of pixels with an associated confidence value of that motion vector. At all refinement iterations, motion vectors of the previous iteration may be used as an input, which may be refined by minimizing a cost criteria. The refinement process may be implemented on a per pixel/block basis by choosing a motion vector from a candidate set which has the minimum cost. After a pre-determined number of iterations, the algorithm may then output the refined motion field and associated confidence values.

Using this iterative method, all blocks in a neighborhood in an image may be used as candidate motion vector sources. Also, the candidates do not necessarily start from initial vectors. The candidates may start from a global minimum of the block-matching criteria combined with prior motion information to make a global minimum search more robust to noise, artifacts, rotation, and brightness change, etc.

Generating an initial motion vector field from a global minimum of the block matching criteria, enables large motion vectors to be found such that a true motion vector field may be quickly converged upon. Furthermore, a constant penalty is not applied to motion discontinuities. For example, a piece-wise-linear penalty may be implemented, which allows more freedom and is able to handle situations in which blocks on the same object have similar, but different, motion vectors.

Additionally, two of the best performing candidates may be stored in memory as opposed to one. This improves the quality of the final motion vector field, since a second best performing candidate may be chosen later in the iterations if it provides a more continuous motion field.

Figure 3:
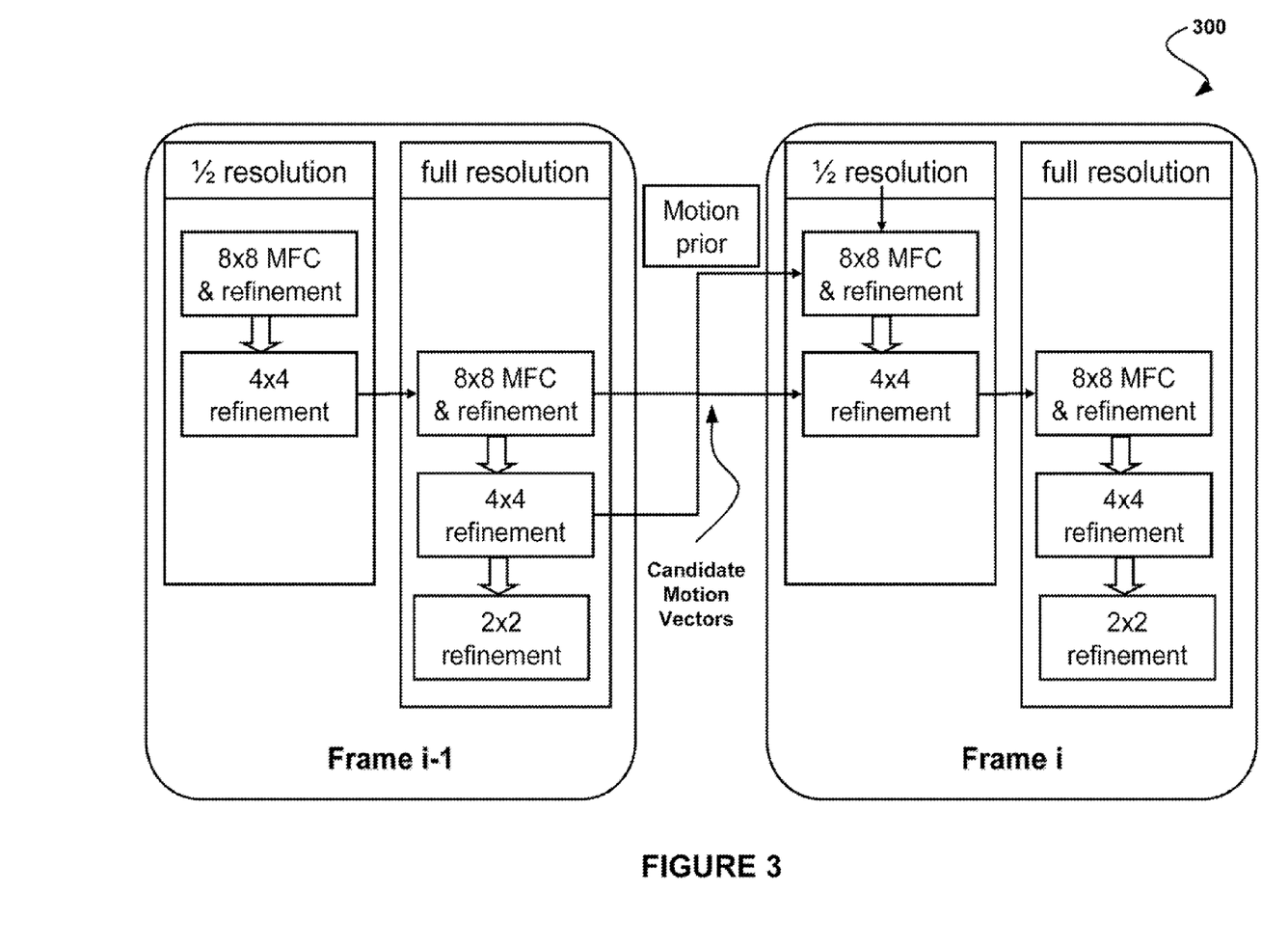
FIG. 3 shows a data flow for using a multi-pass iterative approach in identifying motion in each of a plurality of frames, in accordance with one embodiment.

FIG. 3 shows a data flow 300 for using a multi-pass iterative approach in identifying motion in each of a plurality of frames, in accordance with one embodiment. As an option, the data flow 300 may be implemented in the context of the functionality and architecture of FIGS. 1-2. Of course, however, the data flow 300 may be implemented in any desired environment. Again, the aforementioned definitions may apply during the present description.

As shown in FIG. 3, during half resolution processing, motion field creation (MFC) is implemented. This may include setting up an SAD window for a block, an 8×8 iterative refinement, and a 4×4 iterative refinement. Furthermore, during full resolution processing, motion field creation may be implemented along with an 8×8 iterative refinement, and a 4×4 iterative refinement. As an option, sub-pel recursive motion vector processing may also be implemented to enhance the accuracy of the motion vectors. In this case, the sub-pel motion vector processing may include a 4×4 iterative refinement, and/or a 2×2 iterative refinement.

Figure 4A:
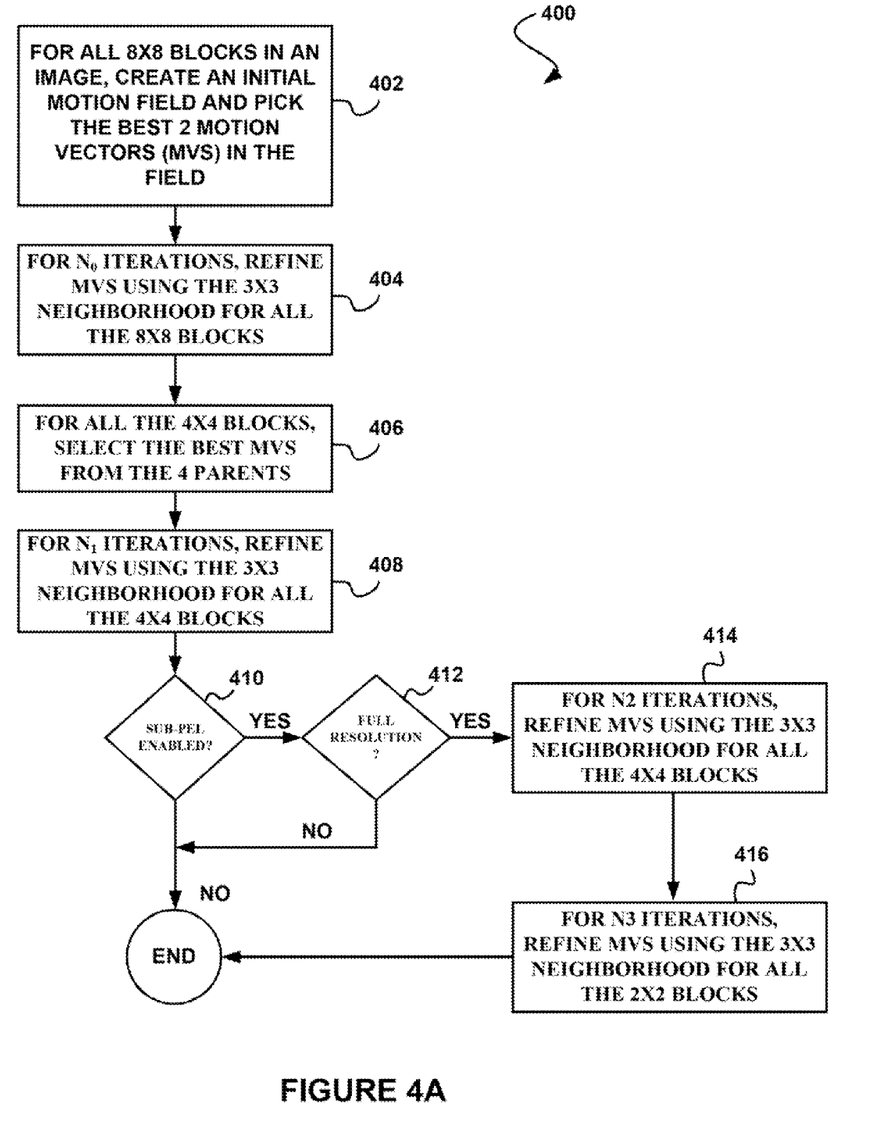
FIG. 4A shows a method for refining motion vectors for both full and half resolution images, in accordance with another embodiment.

FIG. 4A shows a method 400 for refining motion vectors for both full and half resolution images, in accordance with another embodiment. As an option, the present method 400 may be implemented in the context of the functionality and architecture of FIGS. 1-3. Of course, however, the method 400 may be carried out in any desired environment. Further, the aforementioned definitions may apply during the present description.

As shown, for all of a plurality of 8×8 blocks in an image, an initial motion field is created and the best two motion vectors in a field are chosen. See operation 402. In this case, at half resolution, motion vectors may be biased towards previous frame results. At full resolution, motion vectors may be biased towards previous resolution results.

Figure 4B:
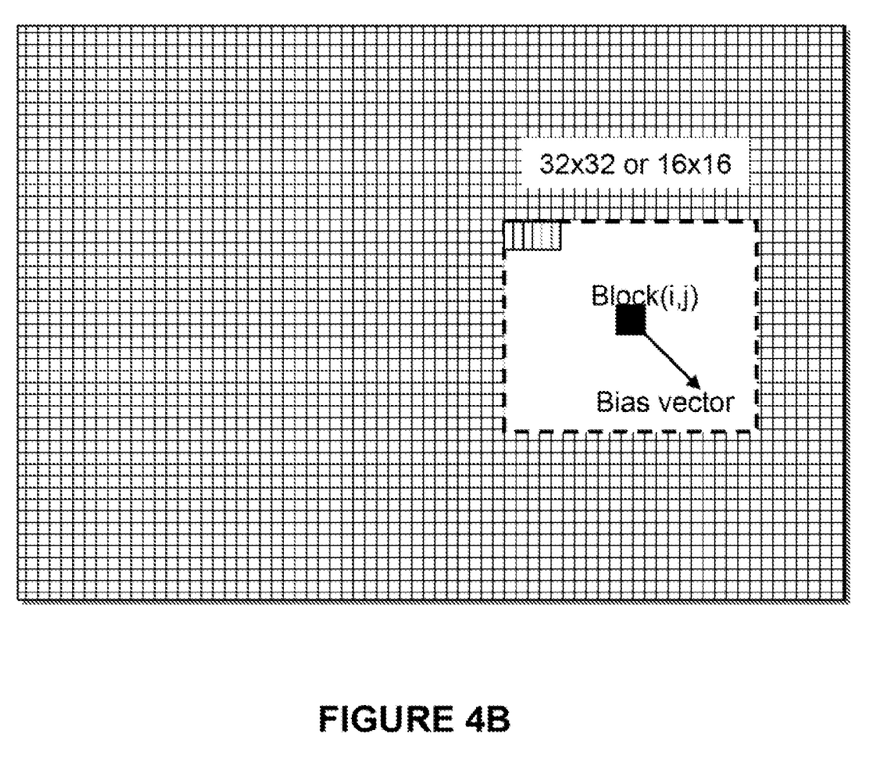
FIG. 4B illustrates a bias vector of a block of pixels, in accordance with one embodiment.

Furthermore, the best representative bias vector from the previous frame or the previous resolution may be identified based on the sum of absolute deviations. FIG. 4B illustrates a bias vector of a block, in accordance with one embodiment. In this case, the best motion vector selection may be the sum of absolute deviations plus a distance from the bias vector weight multiplied by a bias weight. It should be noted that, bias strength may be adapted according to how well the bias vector performs.

Figure 4C:
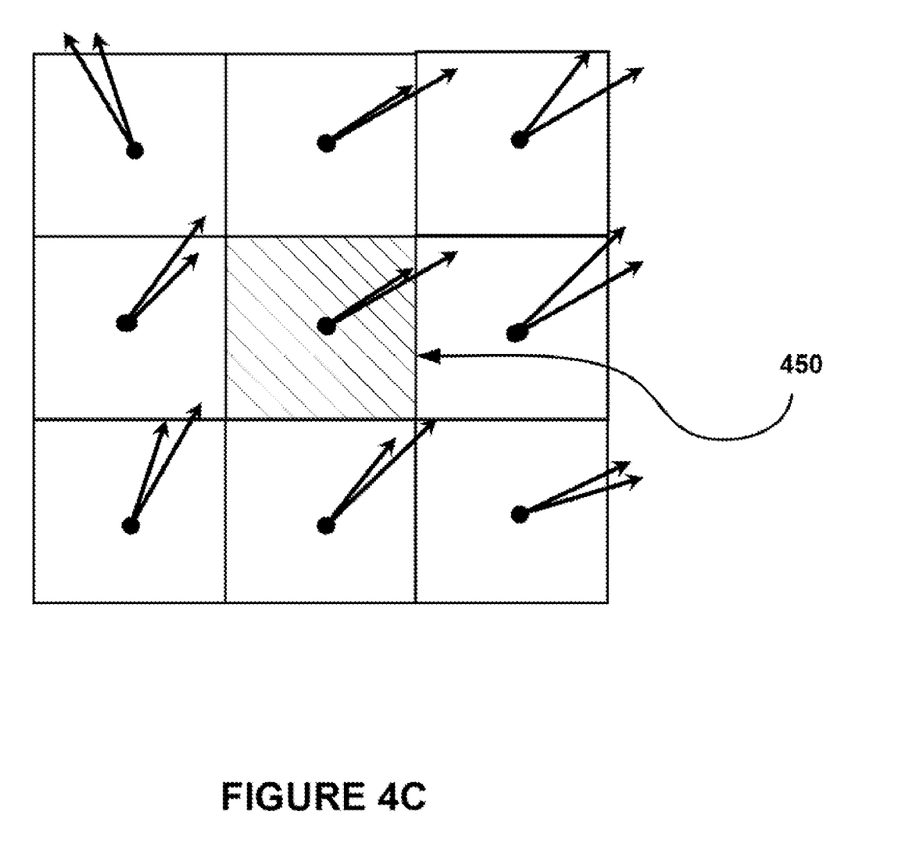
FIG. 4C shows motion vectors to be tested in a 3×3 neighborhood, in accordance with one embodiment.

As shown further in FIG. 4A, for a defined number of iterations ($N_o$), the motion vectors are refined using the 3×3 neighborhood for all the 8×8 blocks. See operation 404. FIG. 4C shows motion vectors to be tested in a 3×3 neighborhood, in accordance with one embodiment. In this process, a block 450 of FIG. 4C, sixteen motion vectors from the surrounding blocks and two motion vectors from the current block, may be assessed using a cost formula and the best motion vectors may be chosen. This operation may be repeated multiple iterations, since in each iteration, the motion vectors from the neighboring blocks will also be refined, producing a smoother motion field.

At each iteration, each candidate vector in the 3×3 block neighborhood is tested, for a total of eighteen candidates. Among the eighteen candidates tested, the candidate that minimizes Expression 8 is chosen, where Δv is described in Expression 9, i and j are the blocks row and column respectively, and c is the candidate motion vector.

$$SAD(v)+c*\Delta v*\text{iteration} \qquad \text{Expression 8}$$

Expression 9

$$\Delta v = \sum_{\{i,j\}=-1}^{\{i,j\}=1} \rho(|v_{0,0} - v_{i,j}|)$$

Figure 4D:
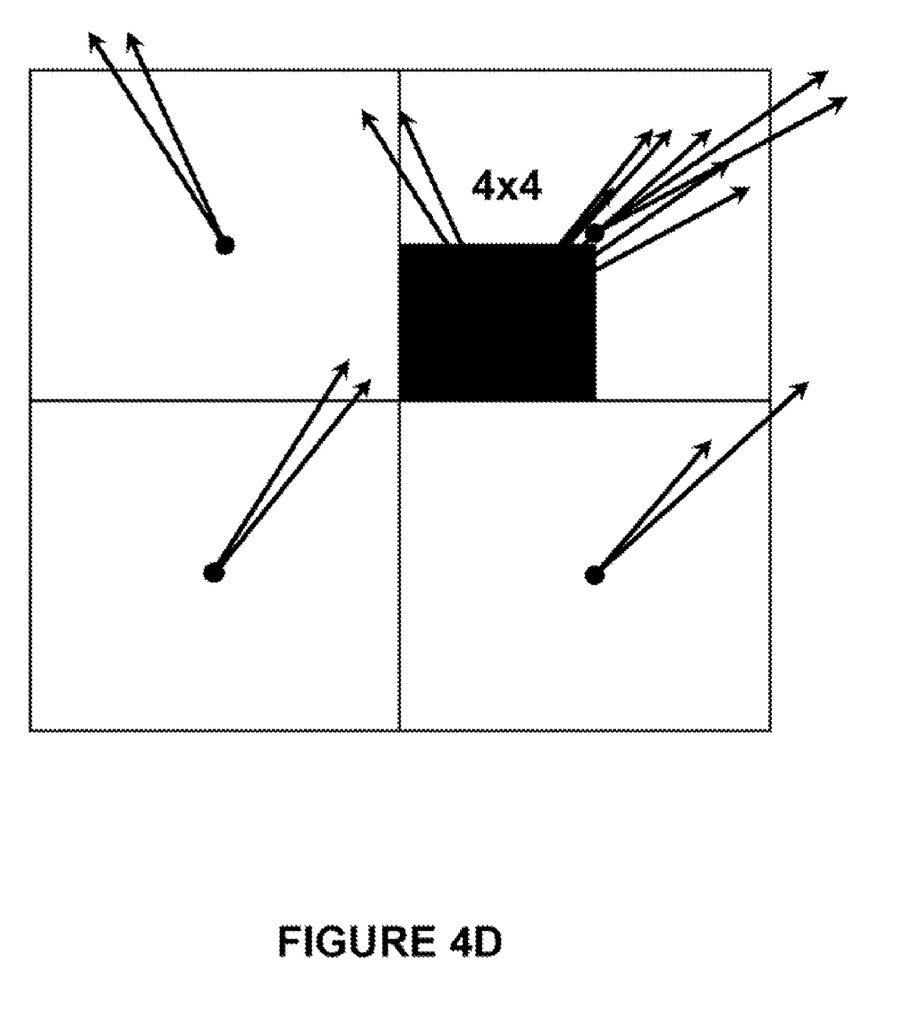
FIG. 4D shows an initial 4×4 motion vector selection, in accordance with one embodiment.

With further reference to FIG. 4A, for all the 4×4 blocks, the best motion vectors from the four parents are then selected. See operation 406. FIG. 4D shows an initial 4×4 motion vector selection, in accordance with one embodiment. Once the best motion vectors are selected, the motion vectors are refined using the 3×3 neighborhood for all the 4×4 blocks, for a defined number of iterations ($N_1$). See operation 408 of FIG. 4A.

It is then determined whether sub-pel recursive processing is enabled and whether the resolution is full resolution. See operations 410 and 412. If sub-pel recursive processing is enabled and the resolution is full resolution, the motion vectors are refined using the 3×3 neighborhood for all the 4×4 blocks for a number of iterations ($N_2$). See operation 414. Additionally, the motion vectors are refined using the 3×3 neighborhood for all the 2×2 blocks for a number of iterations ($N_3$). See operation 416.

For example, motion vectors obtained from full-resolution processing may only be half-pixel accurate. Half-pixel accuracy is obtained since the reference image is twice as big as the current image, hence providing half-pixel values. Sometimes, motion boundaries are at quarter pixel positions. Specifically, for super-resolution applications, quarter-pixel accuracy is desired. In that respect, sub-pel motion vector processing may be added to enhance the accuracy of the motion vectors.

Figure 4E:
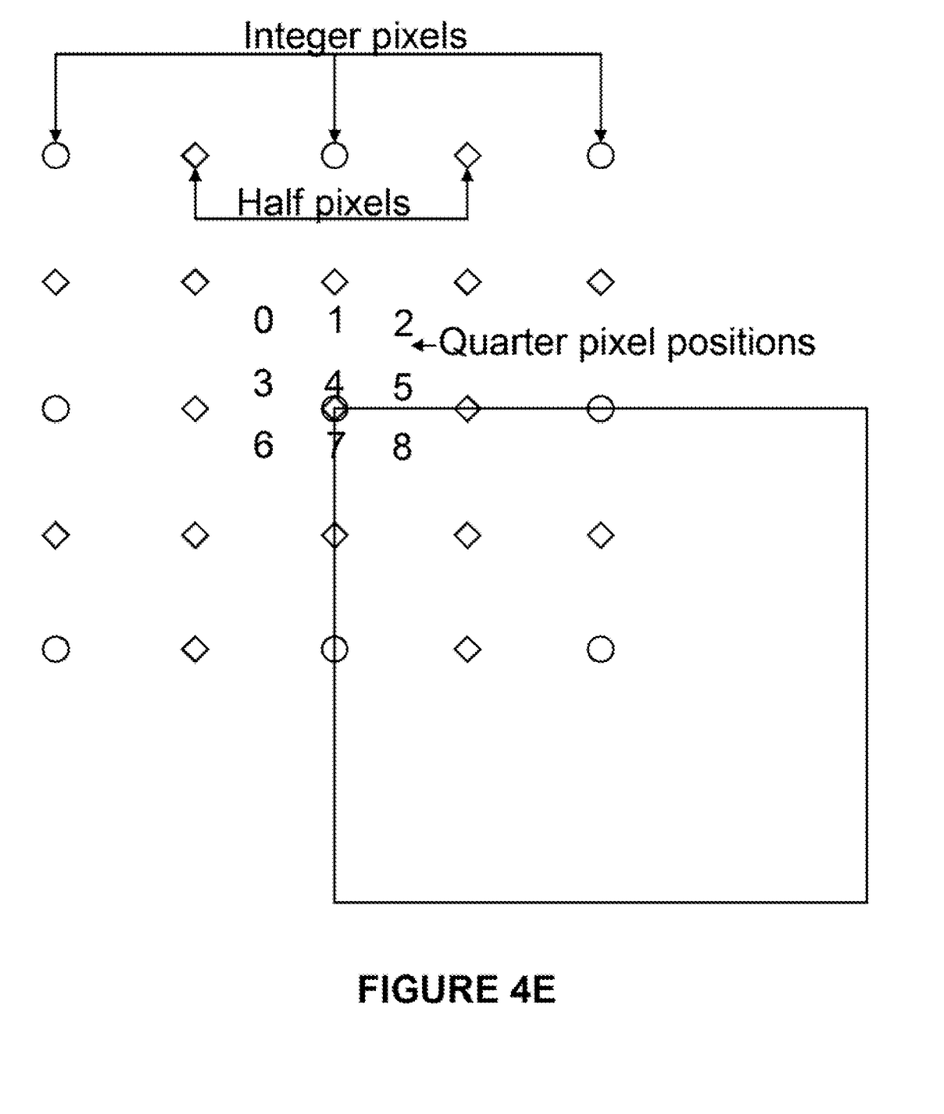
FIG. 4E illustrates a motion vector search in a neighborhood of a 2× up-sampled reference image, in accordance with one embodiment.

At this stage, it is assumed that motion vectors are correctly chosen, however they are not quarter pixel accurate. Quarter pixel accuracy is achieved by searching in a window of (−1, −1) to (1, 1) in up-sampled-by-two image, where (0,0) represents the center of the image. FIG. 4E illustrates a motion vector search in (−1, −1) to (+1, +1) neighborhood in a 2× up-sampled reference image (4× of current), in accordance with one embodiment. It should be noted that sub-pel processing is an option, and may or may not be implemented in various embodiments.

Figure 5:
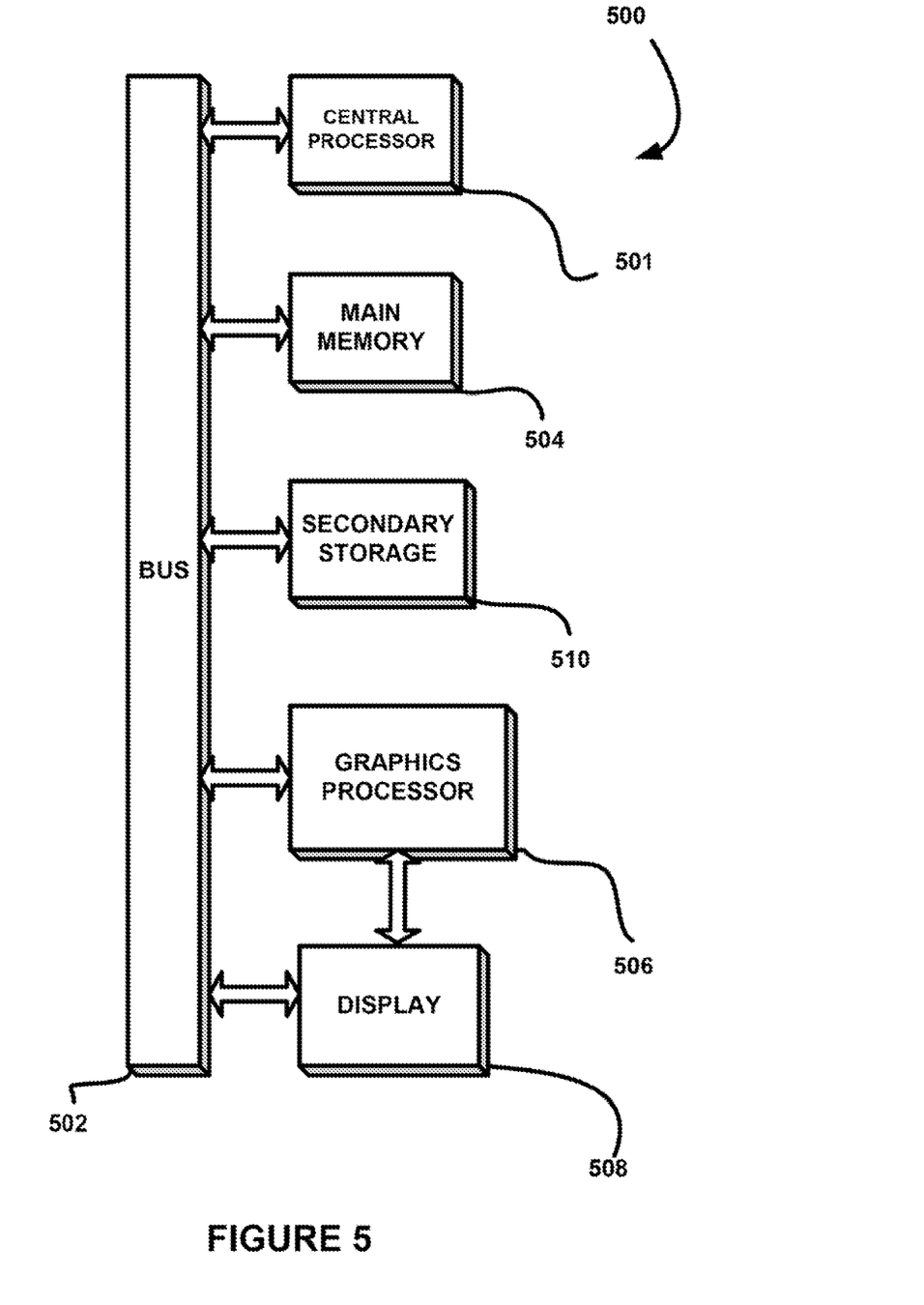
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one host processor 501 which is connected to a communication bus 502. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU). As an option, any of the processors 501 and 506 may be included in a parallel processing architecture. In this case, the parallel processing architecture may be configured to run computer code which is capable of executing the methods described herein.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, an integrated circuit (not shown) that is capable of at least a portion of the capabilities of both the host processor 501 and the graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, lap-top computer, and/or any other type of logic. Still yet, the system 500 may take the form of various other devices including, but not limited to, a personal digital assistant (PDA) device, a mobile phone device, a television, etc.

Further, while not shown, the system 500 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for receiving a frame;
   computer code for decomposing the frame at one half resolution into a plurality of blocks of pixels each of a first size;
   computer code for generating an initial motion field for the frame utilizing the frame at one half resolution and a previously received frame at full resolution, the initial motion field containing a plurality of motion vectors, where at least one motion vector is associated with the frame for each of the plurality of blocks of pixels of the first size;

computer code for, for each of the plurality of blocks of pixels of the first size, selecting at least one motion vector from the plurality of motion vectors;

computer code for, for each of the at least one selected motion vectors, refining the at least one selected motion vector utilizing a neighborhood of the block of pixels for which the at least one selected motion vector was selected;

computer code for decomposing each of the plurality of blocks of pixels of the first size into four blocks of pixels of a second size, the second size being one quarter the size of the first size; and computer code for, for each of the blocks of pixels of the second size, generating at least one motion vector utilizing the refined motion vectors of the frame and at least one motion vector of a block of pixels of the second size from the previously received frame at full resolution.

2. The computer program product of claim 1, wherein a subsequent iteration of the refining is repeated utilizing an output of a previous iteration of the refining.

3. The computer program product of claim 1, and further comprising computer code for generating confidence scores associated with each of the refined motion vectors of the frame.

4. The computer program product of claim 3, wherein the confidence scores and each of the refined motion vectors of the frame are output after a plurality of iterations of the refining.

5. The computer program product of claim 3, wherein the confidence scores are generated based on a smoothness factor.

6. The computer program product of claim 3, wherein the confidence scores are generated based on at least one of information describing motion vectors associated with the previously received frame and information describing the plurality of motion vectors associated with the frame.

7. The computer program product of claim 1, wherein for each of the blocks of pixels of the first size, at least two motion vectors are selected from the plurality of motion vectors.

8. The computer program product of claim 1, wherein the refining is based on a cost criteria.

9. The computer program product of claim 1, wherein the computer code is executed utilizing a parallel architecture.

10. The computer program product of claim 9, wherein the parallel architecture includes a graphics processor.

11. The computer program product of claim 1, wherein the at least one motion vector of the block of pixels of the second size from the previous frame at full resolution is a plurality of motion vectors from at least nine blocks of pixels of the second size from the previous frame at full resolution, the at least nine blocks of pixels of the second size being at least a 3×3 grid of blocks of pixels of the second size with a center block of pixels of the second size at a same location in the previously received frame as where the block of pixels of the second size of the frame is located in the frame.

12. The computer program product of claim 1, further including:

decomposing the frame at full resolution into a second plurality of blocks of pixels each of the first size, and generating a second initial motion field for the frame utilizing:

the frame at full resolution, and the at least one motion vector generated utilizing the refined motion vectors of the frame at half resolution and the at least one motion vector of the block of pixels of the second size from the previously received frame at full resolution, wherein the second initial motion field contains a second plurality of motion vectors, at least one motion vector of the second plurality of motion vectors associated with the frame at full resolution for each of the blocks of pixels of the first size.

13. A method, comprising:

receiving a frame;

reducing a resolution of the frame by one half;

decomposing the frame at one half resolution into a plurality of blocks of pixels each of a first size;

generating an initial motion field for the frame utilizing the frame at one half resolution and a previously received frame at full resolution, the initial motion field containing a plurality of motion vectors, where at least one motion vector is associated with the frame for each of the plurality of blocks of pixels of the first size;

for each of the plurality of blocks of pixels of the first size, selecting at least one motion vector from the plurality of motion vectors;

for each of the at least one selected motion vectors, refining the at least one selected motion vector utilizing a neighborhood of the block of pixels for which the at least one selected motion vector was selected;

decomposing each of the plurality of blocks of pixels of the first size into four blocks of pixels of a second size, the second size being one quarter the size of the first size; and for each of the blocks of pixels of the second size, generating at least one motion vector utilizing the refined motion vectors of the frame and at least one motion vector of a block of pixels of the second size from the previously received frame at full resolution.

14. The method of claim 13, wherein a subsequent iteration of the refining is repeated utilizing an output of a previous iteration of the refining.

15. The method of claim 13, and further comprising generating confidence scores associated with each of the refined motion vectors of the frame.

16. The method of claim 13, wherein for each of the blocks of pixels of the first size, at least two motion vectors are selected from the plurality of motion vectors.

17. A system, comprising:

a graphics processor for:

receiving a frame, reducing a resolution of the frame by one half, decomposing the frame at one half resolution into a plurality of blocks of pixels each of a first size, generating an initial motion field for the frame utilizing the frame at one half resolution and a previously received frame at full resolution, the initial motion field containing a plurality of motion vectors, where at least one motion vector is associated with the frame for each of the plurality of blocks of pixels of the first size, for each of the plurality of blocks of pixels of the first size, selecting at least one motion vector from the plurality of motion vectors;

for each of the at least one selected motion vectors, refining the at least one selected motion vector utilizing a neighborhood of the block of pixels for which the at least one selected motion vector was selected, decomposing each of the plurality of blocks of pixels of the first size into four blocks of pixels of a second size, the second size being one quarter the size of the first size, and for each of the blocks of pixels of the second size, generating at least one motion vector utilizing the refined motion vectors of the frame and at least one motion vector of a block of pixels of the second size from the previously received frame at full resolution.

18. The system of claim 17, wherein the graphics processor remains in communication with memory and a display via a bus.

* * * * *